Figure 1:
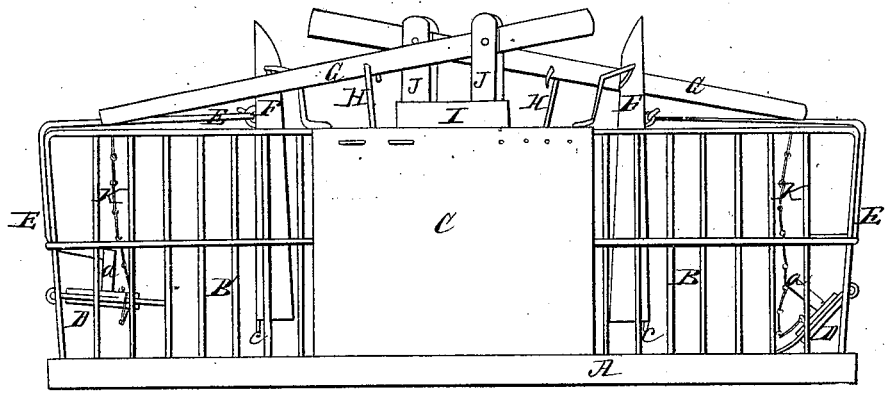
Figure 2:
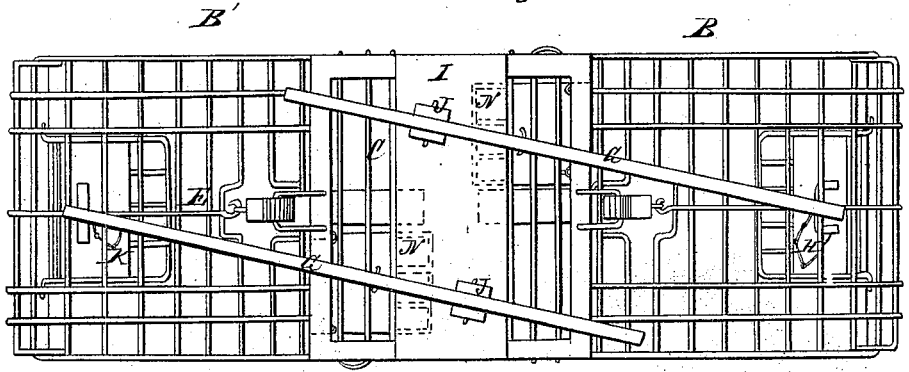

J. J. Cline,
Cage Trap,
№ 76,713. Patented Apr. 14, 1868.

Witnesses:
Wm. Wunslaben
Cornelius Cox

Inventor:
J. J. Cline
Alexander Mason Atty

United States Patent Office.

J. J. CLINE, OF HIGH HILL, OHIO.

Letters Patent No. 76,713, dated April 14, 1868.

IMPROVED ANIMAL-TRAP.

*The Schedule referred to in these Letters Patent and making part of the same.*

TO ALL WHOM IT MAY CONCERN:

Be it known that I, J. J. CLINE, of High Hill, in the county of Muskingum, and in the State of Ohio, have invented certain new and useful Improvements in Animal-Traps; and do hereby declare that the following is a full, clear, and exact description thereof, reference being had to the accompanying drawings, and to the letters of reference marked thereon.

In the annexed drawings, making part of this specification, A represents a platform-board, upon which the trap is built. Upon this platform are three compartments, two at each end, B B', made of wire, and one between these two, made with close sides and a wire top. The compartment B', with its devices, is only a duplication of compartment B.

Each of the compartments B B' is provided with inclined doors, D D, which are hinged at their upper ends, and which, as is usual with this style of trap, rise to admit the animal, and fall to preclude its exit after it has entered.

The door D is provided with a loop, a, upon its upper side, which, when the door is raised, catches over the end of a bar, E, for setting it or keeping it up. This bar E is bent, as represented, and has one end secured to a lever, F, which is hinged or pivoted, in any convenient manner, above the point at which the rod E is attached to it. The lower end of this lever (which stands in a vertical position) stands just in front of the door D, and is provided with a pin or hook, c, upon which the bait is secured.

The door D being raised and caught upon the bar E, the animal has free access to the bait on the lower end of lever F. When it enters the compartment, B or B', and pulls at the bait, the lever F moves the bar E, so that its end slips out of the loop a of door D, and allows said door to fall, and thus confines the animal in this compartment. In seeking egress from the compartment, B or B', it finds a door, N, which leads into the centre compartment C. This door is so inclined that the animal can raise it up to enter the compartment C, and then it immediately falls again, shutting it in.

Connected to the door N is a rod, H, which connects with a lever, G; and this lever G has one of its ends connected, by a cord or chain, to the door D.

Now, when the animal passes into the door N, the lifting of said door, to admit it, raises rod H, and said rod, raising lever G, causes said lever to raise the door D by means of its cord, K. When the door D rises in this manner, its loop catches under the end of bar E, and thus again sets it.

It will thus be seen that, as fast as one animal is caught in compartment B or B', the door D falls to keep it there, and that, as soon as the animal raises the door N to enter the middle compartment, said door N, by means of its connections, raises and sets the outer door D.

When the animals have entered the middle compartment, they are there retained to be killed.

Having thus fully described my invention, what I claim as new, and desire to secure by Letters Patent, is—

The combination of the door D, rod E, and lever F, as arranged with door N, rod H, lever G, and cord K, for forming a self-setting trap, as and for the purpose herein set forth.

In testimony that I claim the foregoing, I have hereunto set my hand, this 6th day of February, 1868.

J. J. CLINE.

Witnesses:
 ELIJAH STEVENS,
 G. ARTHUR.